United States Patent
Ming

(10) Patent No.: US 8,576,455 B2
(45) Date of Patent: Nov. 5, 2013

(54) DETERMINING IF A RECEIVED FAX IS AN AUTO-REPLY FOR A TRANSMITTED FAX

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 56 days.

(21) Appl. No.: 13/431,817

(22) Filed: Mar. 27, 2012

(65) Prior Publication Data

US 2013/0258373 A1    Oct. 3, 2013

(51) Int. Cl.
*H04N 1/00*    (2006.01)

(52) U.S. Cl.
USPC .......................... 358/400; 358/1.15; 358/305

(58) Field of Classification Search
USPC ........................................ 358/1.15, 305, 400
See application file for complete search history.

(56) References Cited

U.S. PATENT DOCUMENTS

| 2004/0010419 A1 | 1/2004 | Sinnott |
| 2007/0195374 A1 | 8/2007 | Tanimoto |
| 2009/0187665 A1 * | 7/2009 | Ozawa et al. ................ 709/228 |
| 2011/0032578 A1 * | 2/2011 | Couchman et al. ........... 358/400 |
| 2011/0188217 A1 | 8/2011 | Miwa |

FOREIGN PATENT DOCUMENTS

JP    2009-253806    * 10/2009

* cited by examiner

*Primary Examiner* — Eric A Rust
(74) *Attorney, Agent, or Firm* — Chen Yoshimura LLP

(57) ABSTRACT

A method implemented in a fax machine for analyzing a received fax to determine whether it is an auto-reply fax. Auto-reply faxes are handled differently from other faxes to avoid unnecessary printing. The analysis method includes: determining whether the sender of the received fax is the same as the receiver of a fax sent by the fax machine within a predefined time period in the past; determining whether the received fax contains only one or two pages; extracting text from the image of the received fax using OCR; and detecting the presents of certain keywords in the extracted text which indicate an auto-reply or received status. These determination and detection results are combined to determine whether the received fax is an auto-reply. Auto-reply faxes may be saved but not automatically printed, or forwarded to an email box of the sender of the original fax, etc.

18 Claims, 2 Drawing Sheets

DETERMINING IF A RECEIVED FAX IS AN AUTO-REPLY FOR A TRANSMITTED FAX

BACKGROUND OF THE INVENTION

1. Field of the Invention

This invention relates to a method implemented in a fax machine for handling an auto-reply fax.

2. Description of Related Art

Some fax machines have the function of automatically transmitting a reply fax after receiving an incoming fax. In other words, when a first machine (the "sending fax machine") sends a fax to a second fax machine (the "receiving fax machine"), the receiving fax machine automatically sends a reply fax (the "auto-reply fax") to the sending fax machine to indicate receipt of the fax. Auto-reply is often used by service companies or departments to assure senders that their fax (e.g. a request for service) was received. Typically, the sending fax machine automatically prints out the auto-reply fax.

While such auto-reply faxes are often useful, in certain situations it can be wasteful. For example, some users of the sending fax machine may not desire an auto-reply. After sending a fax, many users often do not return to the fax machine to check the transmission status or collect the auto-reply fax. As a result, the printout of the auto-reply fax is left on the sending fax machine. Such a printout is often a waste of resources. Moreover, when multiple users share a fax machine, which is often the case in organizations, the auto-reply printout left on the fax machine may cause private or confidential information to be revealed to others. In some other instances, when a transmission fails, the sending users may miss the failure notice because they do not return to the fax machine to check the status.

SUMMARY

The present invention is directed to a method and related apparatus for analyzing and processing received fax documents with the objective of reducing unnecessary or unwanted printing of auto-reply faxes, thereby saving resources such as paper, ink and toner.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

Accordingly, the present invention is directed to a method implemented in a fax machine for analyzing and processing a received fax document, the fax document being in the form of an image, which includes: (a) performing optical character recognition on the image to extract textual content of the received fax document; (b) determining whether a sender of the received fax document is identical to a receiver of any faxes sent by the fax machine within a predefined time period before a time of receipt of the received fax document; (c) determining whether the received fax document contains only one or two pages; (d) detecting keywords indicating an auto-reply in the extracted textual content; (e) detecting keywords indicating a received status in the extracted textual content; (f) determining whether the received fax document is an auto-reply based on the determination and detection results in steps (b) through (e); and (g) when the received fax document is determined not to be an auto-reply, printing the fax document, and when the received fax document is determined to be an auto-reply, taking an alternative action.

In another aspect, the present invention provides a fax machine which includes: a scanning section for scanning hard copy documents to be sent as fax; a printing section for printing received fax documents; a communication interface section for transmitting and receiving fax documents; a user interface section for receiving user input; a memory for storing a computer readable program code and data; and a processing section for executing the computer readable program code stored in the memory to control the fax machine to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method, implemented in a fax machine, to analyze a received fax to determine whether it is an auto-reply fax, and if it is, to handle it accordingly to avoid unnecessary printing. Here, a "fax machine" broadly includes any machine that has the ability to receive and automatically print out fax documents, for example multi-function printer (MFP), all-in-one (AIO) printer, etc.

Figure 2:
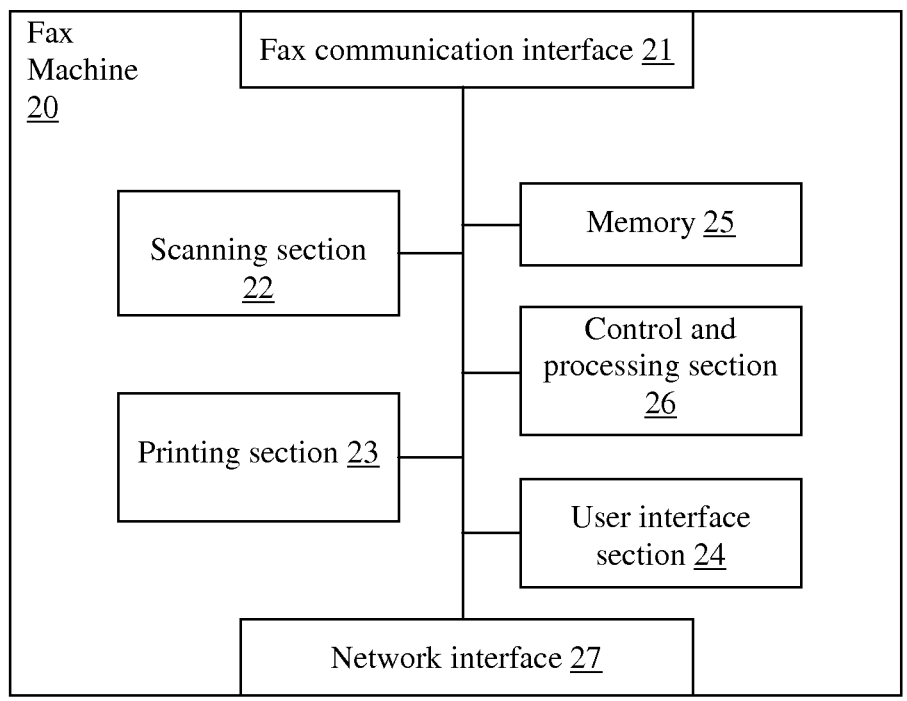
FIG. 2 schematically illustrates a fax machine in which a method according to embodiments of the present invention may be implemented.

The method may be implemented by software or firmware code stored in a memory of the fax machine and executed by a processor of the fax machine. As shown in FIG. 2, the fax machine 20 according to embodiments of the present invention includes a fax communication interface section 21 for receiving and transmitting fax signals via a telephone line, a scanning section 22 for scanning hard copy documents to be sent as faxes, a printing section 23 for printing received faxes, a user interface section 24 (e.g., push buttons, a display panel, etc.) for interacting with users, a memory 25 for storing program code and other data, and a processing section 26 for controlling various components of the fax machine and performing various processing. In addition, the fax machine may have a network communication interface 27 for communicating with a network such as the Internet or an intranet. These components are connected to each other via a suitable communication link such as a bus. The fax document analysis and handling method described below is implemented as program code stored in the memory and executed by the processing section.

Figure 1:
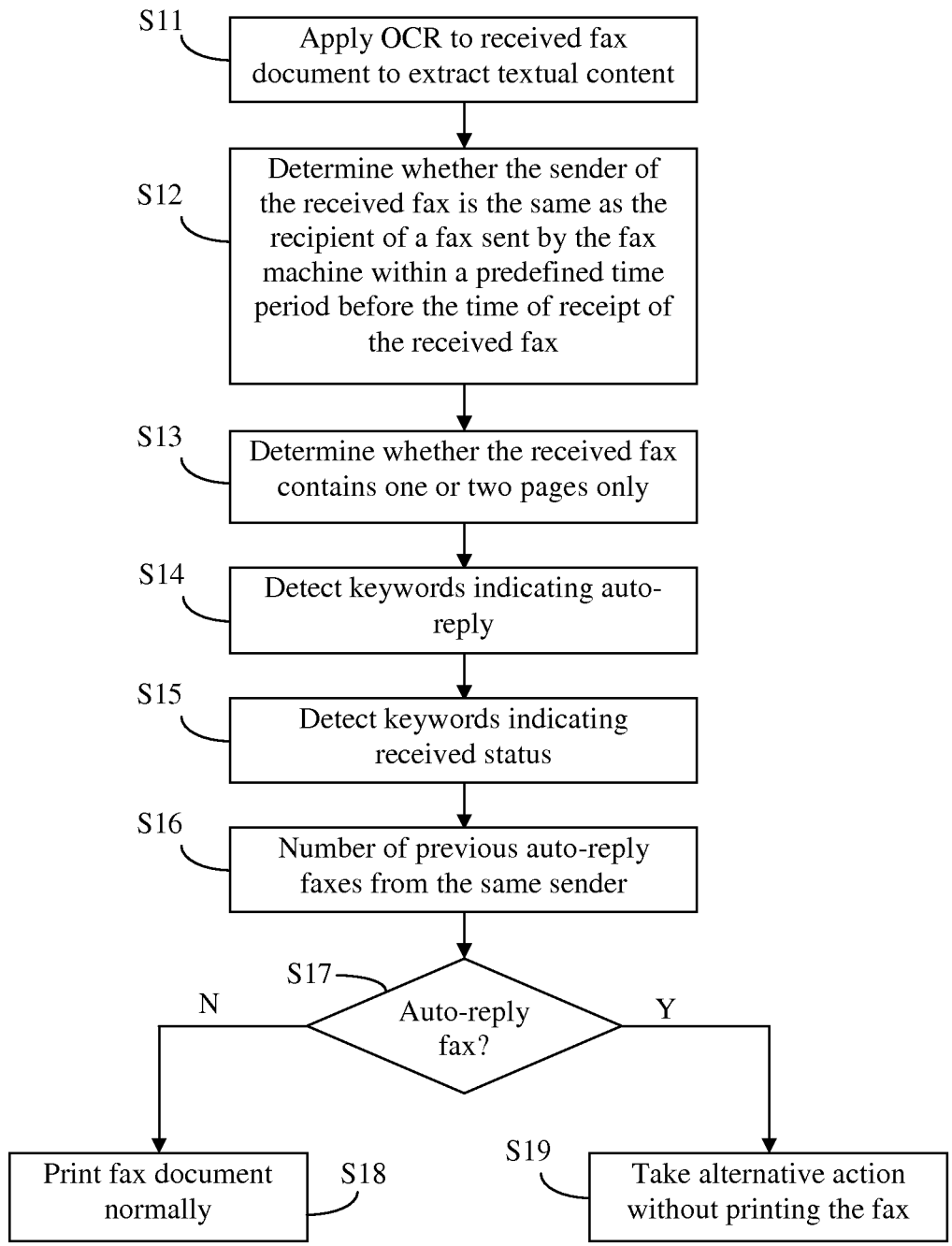
FIG. 1 schematically illustrates a method implemented in a fax machine for analyzing and handling auto-reply fax according to an embodiment of the present invention.

FIG. 1 illustrates a method of analyzing and processing received fax documents according to an embodiment of the present invention. As a received fax document is in the form of a bitmap image, an OCR (optical character recognition) step is applied to extract the textual content contained in the received fax R (step S11). Information regarding the received fax R and the extracted textual content are analyzed to determine whether the fax is an auto-reply fax (steps S12 to S15).

More specifically, in step S12, the fax machine determines whether the sender of the received fax R is the same as the receiver of any of the faxes sent by the fax machine within a predefined time period (e.g., 10 minutes) before the time of receipt of the fax R. This is done by referring to a sending log maintained by the fax machine. The sending log records all faxes recently sent from the fax machine, including the sent time and the recipient's ID (e.g. recipient's fax number or the name of an individual or organization). Typically, an auto-reply is received within a short time period after the original fax is sent. Thus, if the determination in step S12 is "yes", there is a high likelihood that the received fax R is an auto-reply of the previously sent fax.

Step S13 determines whether the received fax R contains only one or two pages. A typical auto-reply fax contains one or two pages only.

Steps S14 and S15 apply a content based analysis to the text of the fax R extracted by OCR. Typical content of an auto-reply fax includes one or more of: a title indicating it is an auto-reply, a "from" fax number, a "to" fax number, a time of receipt of the fax being acknowledged, number of pages received, status of transmission (success or failure), tracking number assigned by the receiving fax machine, etc. Sometimes, the auto-reply includes a reduced-size image of the first page of the fax that was received. Thus, step S14 detects the presence of keyword indicating an auto-reply, such as "automatic", "reply", "response", "received", "AutoReply", "automatic response", "Reply from automatic system", "Your fax is received", etc., in the extracted text. Such keywords are often found in the title of an auto-reply fax. Step S15 detects keywords indicating received status, such as "received successfully", "successful", "failed", "total pages received", etc., in the extracted text. Sometimes customized message indicating the recipient's business policy are also included in the auto-reply, such as, "Your request will be processed in xx business days", "We will contact you as soon as possible", etc. Keywords in such text may be detected as a part of step S15.

Step S16 determines whether auto-reply faxes have been received from the same sender in the past. The number of such previous auto-reply faxes may also be determined. Because not all fax machines have an auto-reply function and sometimes the auto-reply function (even if available) is turned off, the fact that auto-replies have been received from the same sender in the past tends to indicate that the fax machine of the sender has an auto-reply function and it is turned on. This increases the likelihood that the currently received fax may be an auto-reply. For this purpose, the fax machine 20 maintains a record of senders of received faxes and whether auto-reply faxes have been received from them and/or the number of previous auto-reply faxes.

It should be noted that since steps S12 and S13 do not depend on the extracted text of the fax document, these steps may be performed before the OCR step S11. Generally, the order of steps S12 to S15 is not important so long as step S11 is performed before steps S14 and S15.

The results of steps S12 to S16 are combined to determine whether the received fax R is an auto-reply (step S17). For example, each of the determination result may be assigned a numeric value (e.g., 1 for affirmative determination or detection, 0 for negative determination or detection), and a weighted sum of the values may be calculated. If the sum is greater than a predetermined threshold value, the received fax R is determined to be an auto-reply. In another example, if the determination in step S12 is affirmative and the auto-reply keywords are detected in step S14, then the received fax R is determined to be an auto-reply.

If the received fax is determined not to be an auto-reply ("N" in step S17), it is printed out normally (step S18). If the fax is determined to be an auto-reply ("Y" in step S17), an alternative action is taken (step S19). Preferably, in step S19 the auto-reply fax is not automatically printed. For example, the auto-reply fax may be transferred to an email address of the sender of the original fax if the sender can be identified. As mentioned earlier, a fax machine is often shared among multiple users in an organization, and the fax machine may maintain separate user accounts and require the users to input a pin or password before sending a fax. In such cases, the sending user's ID is recorded in the sending log of the fax machine. Thus, if the determination in step S12 is affirmative, the fax machine will be able to identify the user who sent the original fax to which the auto-reply pertains. Thus, the fax machine can transfer the auto-reply to an email box of the identified sender via the network interface 27. If the sender of the original fax cannot be identified or an email box is not available for the sender, the fax machine may save the auto-reply fax in a public mailbox or folder on the fax machine (e.g. a dedicated auto-reply folder), and generate an appropriate alert to alert the users of the existence of an auto-reply fax. The alert may be a flashing light, a message displayed on the display panel of the fax machine, a beep, etc. Users may subsequently check or print out the unprinted fax, or take no further action.

In and alternative embodiment of step S19, if step S15 has detected keywords that indicate a successful transmission status, the fax machine saves the auto-reply fax in a public mailbox or folder without taking any further actions. On the other hand, if step S15 had detected keywords that indicate a failure status, the fax machine prints out the auto-reply fax and/or display a warning message on the fax machine.

It will be apparent to those skilled in the art that various modification and variations can be made in the auto-reply fax handling method and related apparatus of the present invention without departing from the spirit or scope of the invention. Thus, it is intended that the present invention cover modifications and variations that come within the scope of the appended claims and their equivalents.

What is claimed is:

1. A method implemented in a fax machine for analyzing and processing a received fax document, the fax document being in the form of an image, comprising:
    (a) performing optical character recognition on the image to extract textual content of the received fax document;
    (b) determining whether a sender of the received fax document is identical to a receiver of any faxes sent by the fax machine within a predefined time period before a time of receipt of the received fax document;
    (c) determining whether the received fax document contains only one or two pages;
    (d) detecting keywords indicating an auto-reply in the extracted textual content;
    (e) detecting keywords indicating a received status in the extracted textual content;
    (f) determining whether the received fax document is an auto-reply based on the determination and detection results in steps (b) through (e); and
    (g) when the received fax document is determined not to be an auto-reply, printing the fax document, and when the received fax document is determined to be an auto-reply, taking an alternative action.

2. The method of claim 1, wherein step (b) is performed by referring to a sending log maintained by the fax machine.

3. The method of claim 1, wherein the keywords in step (d) include one or more of: "automatic," "reply," "response," "received," "AutoReply," and "automatic response."

4. The method of claim 1, wherein the keywords in step (e) include one or more of:

"received successfully," "successful," "failed," and "total pages received."

5. The method of claim 1, further comprising, before steps (f) and (g):

(h) determining whether any auto-reply faxes have been previously received from the sender of the received fax document; and wherein the determining step (f) is further based on the determination result of step (h).

6. The method of claim 5, wherein step (f) comprises:

assigning a numeric value to each determination or detection result in steps (b) through (e) and (h);

calculating a weighted sum of the numeric values; and determining whether the received fax document is an auto-reply by comparing the weighted sum to a predetermined threshold value.

7. The method of claim 1, wherein step (f) comprises:

if the determination in step (b) is affirmative and the keywords indicating an auto-reply is detected in step (d), determining the received fax to be an auto-reply.

8. The method of claim 1, wherein the alternative action in step (g) comprises: if in step (b) it is determined that the sender of the received fax document is identical to the receiver of any faxes sent by the fax machine within a predefined time period before a time of receipt of the received fax document, identifying a sender of the previous fax; and transferring the received fax document to an email box associated with the identified sender without printing the received fax document.

9. The method of claim 1, wherein the alternative action in step (g) comprises: if in step (e), a keyword indicating a successful status is detected, saving the fax document without printing it; and if in step (e), a keyword indicating a failure status is detected, displaying a warning message on the fax machine.

10. A fax machine comprising:

a scanning section for scanning hard copy documents to be sent as fax;

a printing section for printing received fax documents;

a communication interface section for transmitting and receiving fax documents;

a user interface section for receiving user input;

a memory for storing a computer readable program code and data; and a processing section for executing the computer readable program code stored in the memory to control the fax machine to perform a process which comprises:

(a) performing optical character recognition on the image to extract textual content of the received fax document;

(b) determining whether a sender of the received fax document is identical to a receiver of any faxes sent by the fax machine within a predefined time period before a time of receipt of the received fax document;

(c) determining whether the received fax document contains only one or two pages;

(d) detecting keywords indicating an auto-reply in the extracted textual content;

(e) detecting keywords indicating a received status in the extracted textual content;

(f) determining whether the received fax document is an auto-reply based on the determination and detection results in steps (b) through (e); and (g) when the received fax document is determined not to be an auto-reply, printing the fax document, and when the received fax document is determined to be an auto-reply, taking an alternative action.

11. The fax machine of claim 10, wherein in the process, step (b) is performed by referring to a sending log maintained by the fax machine.

12. The fax machine of claim 10, wherein the keywords in step (d) include one or more of:

"automatic," "reply," "response," "received," "AutoReply," and "automatic response."

13. The fax machine of claim 10, wherein the keywords in step (e) include one or more of:

"received successfully," "successful," "failed," and "total pages received."

14. The fax machine of claim 10, wherein the process further comprises, before steps (f) and (g):

(h) determining whether any auto-reply faxes have been previously received from the sender of the received fax document; and wherein the determining step (f) is further based on the determination result of step (h).

15. The fax machine of claim 14, wherein in the process, step (f) comprises:

assigning a numeric value to each determination or detection result in steps (b) through (e);

calculating a weighted sum of the numeric values; and determining whether the received fax document is an auto-reply by comparing the weighted sum to a predetermined threshold value.

16. The fax machine of claim 10, wherein in the process, step (f) comprises:

if the determination in step (b) is affirmative and the keywords indicating an auto-reply is detected in step (d), determining the received fax to be an auto-reply.

17. The fax machine of claim 10, further comprising a network interface for communicating over a network; and wherein in the process, the alternative action in step (g) comprises:

if in step (b) it is determined that the sender of the received fax document is identical to the receiver of any faxes sent by the fax machine within a predefined time period before a time of receipt of the received fax document, identifying a sender of the previous fax; and transferring the received fax document over the network to an email box associated with the identified sender without printing the received fax document.

18. The fax machine of claim 10, wherein in the process, the alternative action in step (g) comprises:

if in step (e), a keyword indicating a successful status is detected, saving the fax document without printing it; and if in step (e), a keyword indicating a failure status is detected, displaying a warning message on the fax machine.

* * * * *